(12) United States Patent
Nordlin

(10) Patent No.: US 8,904,911 B2
(45) Date of Patent: Dec. 9, 2014

(54) SLEEVE FOR A PUNCH ASSEMBLY

(71) Applicant: Greenlee Textron Inc., Rockford, IL (US)

(72) Inventor: William F. Nordlin, Poplar Grove, IL (US)

(73) Assignee: Textron Innovations Inc., Providence, RI (US)

( * ) Notice: Subject to any disclaimer, the term of this patent is extended or adjusted under 35 U.S.C. 154(b) by 258 days.

(21) Appl. No.: 13/693,440

(22) Filed: Dec. 4, 2012

(65) Prior Publication Data

US 2013/0145916 A1   Jun. 13, 2013

Related U.S. Application Data

(60) Provisional application No. 61/568,893, filed on Dec. 9, 2011.

(51) Int. Cl.
| | | |
|---|---|---|
| B26D 3/00 | (2006.01) | |
| B23D 35/00 | (2006.01) | |
| B26F 1/38 | (2006.01) | |
| B26F 1/14 | (2006.01) | |
| B23P 11/00 | (2006.01) | |
| B21D 28/34 | (2006.01) | |
| B26F 1/44 | (2006.01) | |

(52) U.S. Cl.
CPC ............. B23D 35/004 (2013.01); B26F 1/386 (2013.01); B26F 1/14 (2013.01); B23P 11/00 (2013.01); B21D 28/343 (2013.01); B26F 1/44 (2013.01)
USPC ........ 83/55; 30/360; 83/684; 83/685; 83/686; 83/687; 83/688; 83/689; 83/690

(58) Field of Classification Search
USPC ................ 83/684–690, 13, 30, 55, 743, 745, 83/698.71, 698.91, 360; 403/192, 194, 403/196, 197, 200; 30/360
See application file for complete search history.

(56) References Cited

U.S. PATENT DOCUMENTS

| | | | | |
|---|---|---|---|---|
| 2,145,725 | A * | 1/1939 | Jamieson | 30/366 |
| 2,237,069 | A * | 4/1941 | Christenson | 30/360 |
| 3,269,011 | A * | 8/1966 | Herrstrum | 30/360 |
| 4,495,669 | A * | 1/1985 | Hooper | 15/143.1 |
| 4,905,557 | A | 3/1990 | Adleman | |
| 6,973,729 | B2 | 12/2005 | Nordlin | |
| 6,981,327 | B2 | 1/2006 | Nordlin | |
| 7,587,830 | B2 | 9/2009 | Nordlin | |
| 2004/0206223 | A1 * | 10/2004 | Rosene et al. | 83/686 |

OTHER PUBLICATIONS

GB, Gardner Bender, Hole Making (14 pages).
ALFRA Index, Drilling—Punching—Cutting—Deburring, Catalog 21 Punching (25 pages).

(Continued)

*Primary Examiner* — Boyer D Ashley
*Assistant Examiner* — Richard Crosby, Jr.
(74) *Attorney, Agent, or Firm* — Klintworth & Rozenblat IP LLC

(57) ABSTRACT

A punch assembly includes a punch, a sleeve, a draw stud and a die. The sleeve adds rigidity to the draw stud, thereby reducing elastic deflection of the draw stud, reducing bending moment on the draw stud, reducing punching force, and extending the punch, draw stud and die fatigue life. The sleeve also aids in axial alignment of the punch, die and workpiece with a pilot hole drilled through a workpiece.

11 Claims, 6 Drawing Sheets

(56) References Cited

OTHER PUBLICATIONS

Dayton Technical, Improving Perforating Die Performance, Copyright 2004 Dayton Progress Corporation (4 pages).
Co-planar, inc., Design Considerations and Recommendations (4 pages).
The Hole Thing (p. 113), Technical Data, www.unipunch.com, (one page).
Techniques of Pressworking Sheet Metal, An Engineering Approach to Die Design, Donald F. Eary and Edward A. Reed, © 1958 by Prentice-Hall, Inc. (28 pages).

* cited by examiner

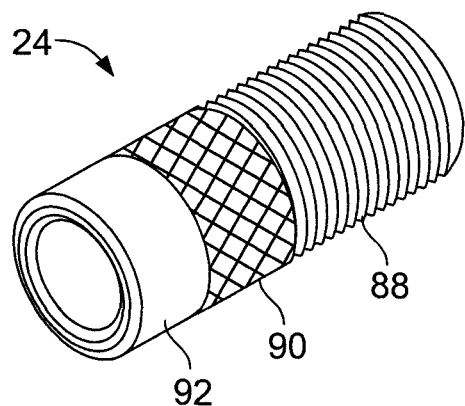
FIG. 8
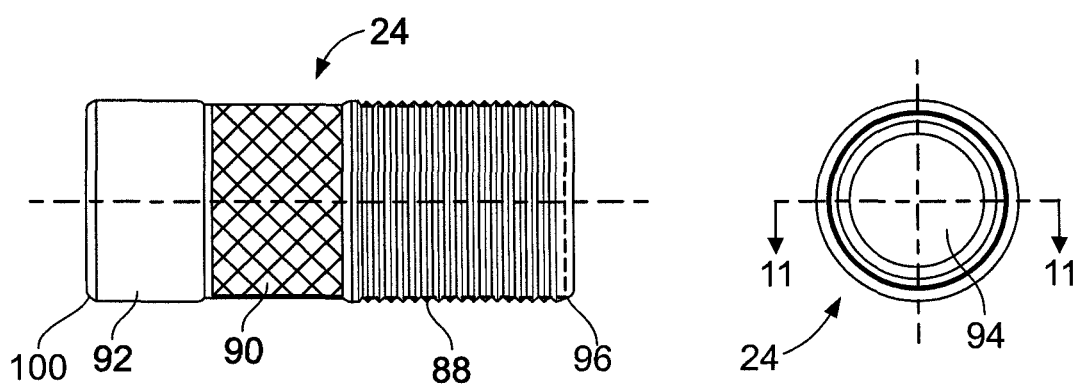
FIG. 9
FIG. 10
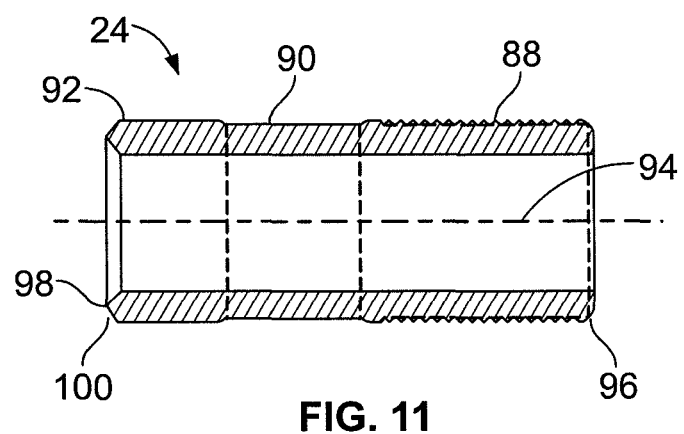
FIG. 11

SLEEVE FOR A PUNCH ASSEMBLY

This application claims the domestic benefit of provisional application Ser. No. 61/568,893, filed on Dec. 9, 2011, which disclosure is herein incorporated by reference in its entirety.

FIELD OF THE INVENTION

This invention is generally directed to a sleeve for a punch assembly for adding rigidity to a draw stud, and the method of use thereof.

BACKGROUND OF THE INVENTION

A punch is used in conjunction with a punch driver to punch holes in sheet metal, for example in the walls of electrical cabinets, aluminum, fiberglass and plastic. The punch is mounted on a sleeve, which in turn, is mounted on a draw stud.

Generally, when a hole is to be punched in an electrical cabinet, a small hole is first drilled in the wall of the electrical cabinet. A first end of the draw stud is threaded into a ram of a hydraulic punch driver. A second end of the draw stud is inserted through a punching die and then through the drilled hole, the draw stud having a diameter that is less than the diameter of the drilled hole. The second end is then inserted into a sleeve which is mounted on a punch. The sleeve is threaded onto the second end of the draw stud on the opposite side of the electrical cabinet than is the punching die and the hydraulic punch driver.

An operator actuates a hand pump of the hydraulic punch driver. When the hand pump of the hydraulic punch driver is actuated, hydraulic fluid forces the ram to pull the draw stud. The draw stud, in turn, pulls the knockout punch through the electrical cabinet into the die such that the desired hole size is punched.

Hydraulic systems (hand pump, hose, and ram) that electricians use to punch holes in electrical cabinets have a rated capacity of 11 Ton (22,000 pounds force). Punching large holes (up to 4.5" diameter) in 10 gage (0.134 inch thick) stainless steel with a conventional 4-point punch requires 12-15 Tons (24,000 to 30,000 pounds force).

Higher punching force are required if the cutting edge of the punch is "too dull" (neutral or negative cut edge geometry). Reduced punch durability occurs if the punch cutting edge is too "sharp" (positive cut edge geometry). A less ideal punch/die clearance leads to a higher frequency of "chipping" the punch or die cutting edge due to misalignment of the punch and die.

With regard to cutting a hole in 10 gage stainless steel, such a hole can be cut with great physical effort and high tool wear cost. A 4" conduit hole can be made in 10 gage stainless steel using a carbide hole cutter, or possibly a carbide grit hole saw, reciprocating saw, or saber saw. All these methods, however, are labor intensive and may wear out several tools in order to make just one hole.

A sleeve for a punch assembly is provided herein which provides improvements to existing punch assemblies. Other features and advantages will become apparent upon a reading of the attached specification, in combination with a study of the drawings.

SUMMARY OF THE INVENTION

A punch assembly includes a punch, a sleeve, a draw stud and a die. The sleeve adds rigidity to the draw stud, thereby reducing elastic deflection of the draw stud, reducing bending moment on the draw stud, reducing punching force, and extending the punch, draw stud and die fatigue life. The sleeve also aids in axial alignment of the punch, die and workpiece with a pilot hole drilled through a workpiece.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 8 is a perspective view of the sleeve;

FIG. 9 is a side elevational view of the sleeve;

FIG. 10 is a front plan view of the sleeve;

FIG. 11 is a cross-sectional view of the sleeve along line 11-11 of FIG. 10;

DETAILED DESCRIPTION OF THE ILLUSTRATED EMBODIMENT

Figure 1:
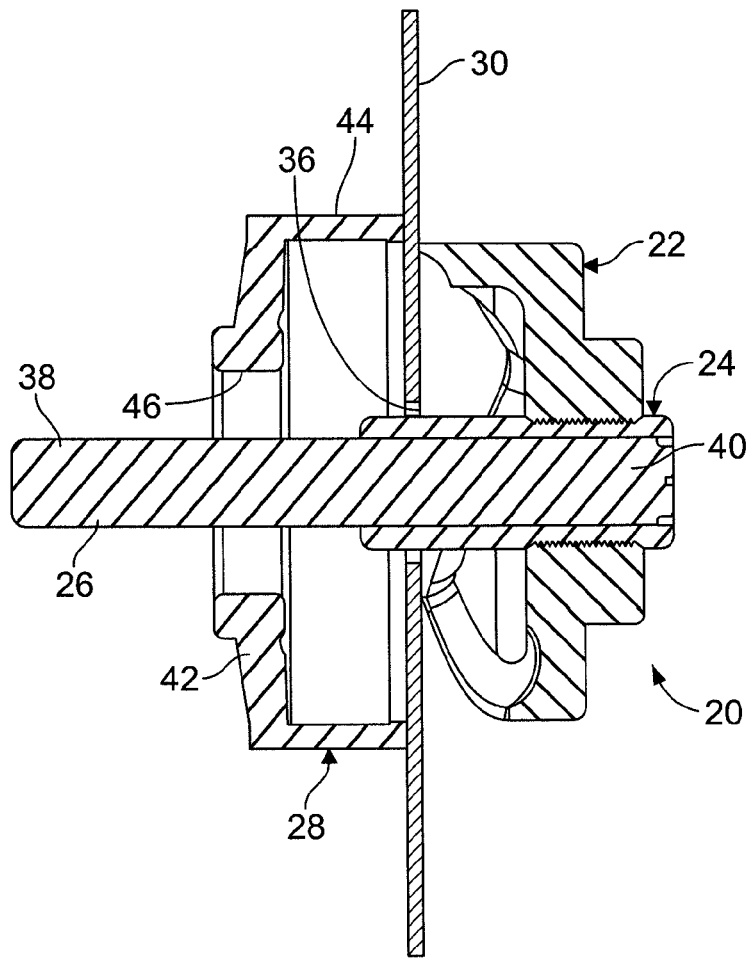
FIG. 1 is a cross-sectional view of a punch assembly which incorporates the features of the present invention, the punch assembly includes a punch, a sleeve, a draw stud and a die.
Figure 2:
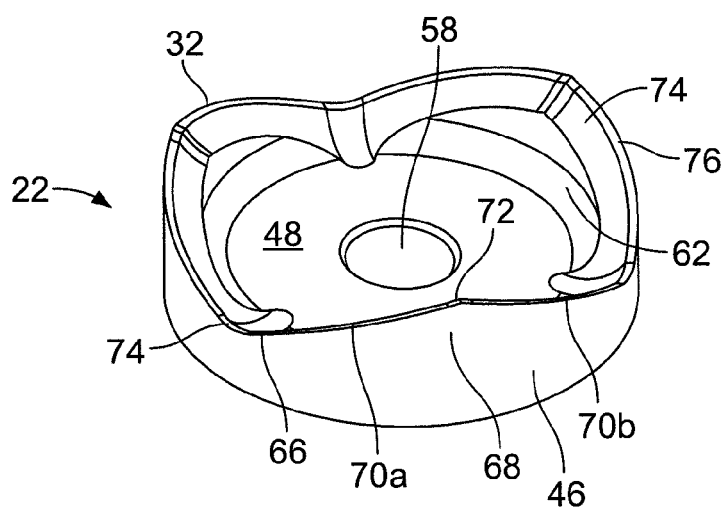
FIG. 2 is a perspective view of the punch.
Figure 3:
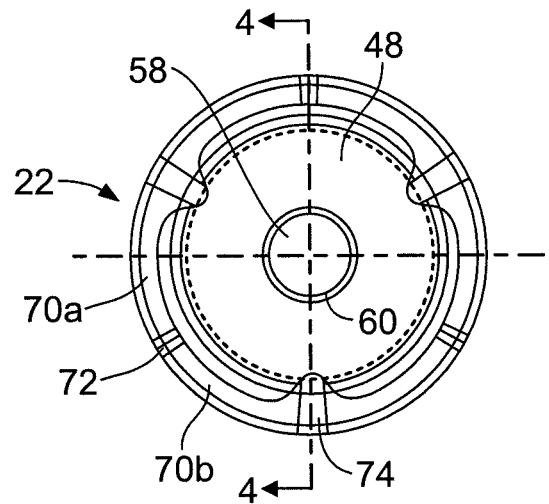
FIG. 3 is a front plan view of the punch.
Figure 4:
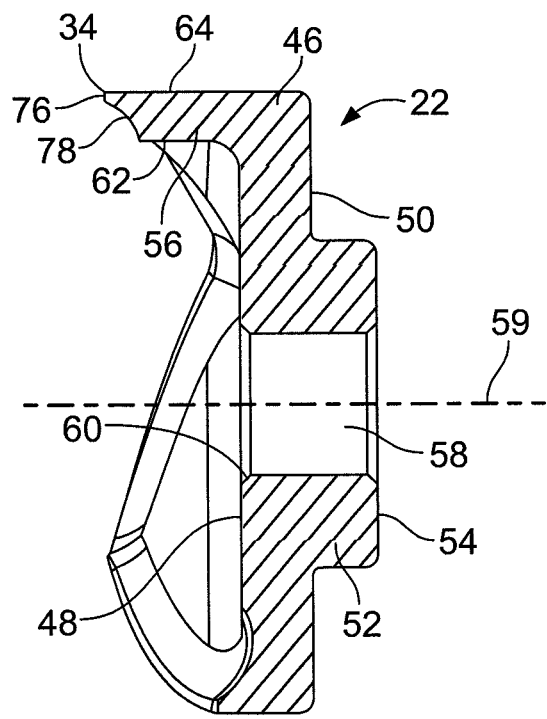
FIG. 4 is a cross-sectional view of the punch along line 4-4 of FIG. 3.
Figure 5:
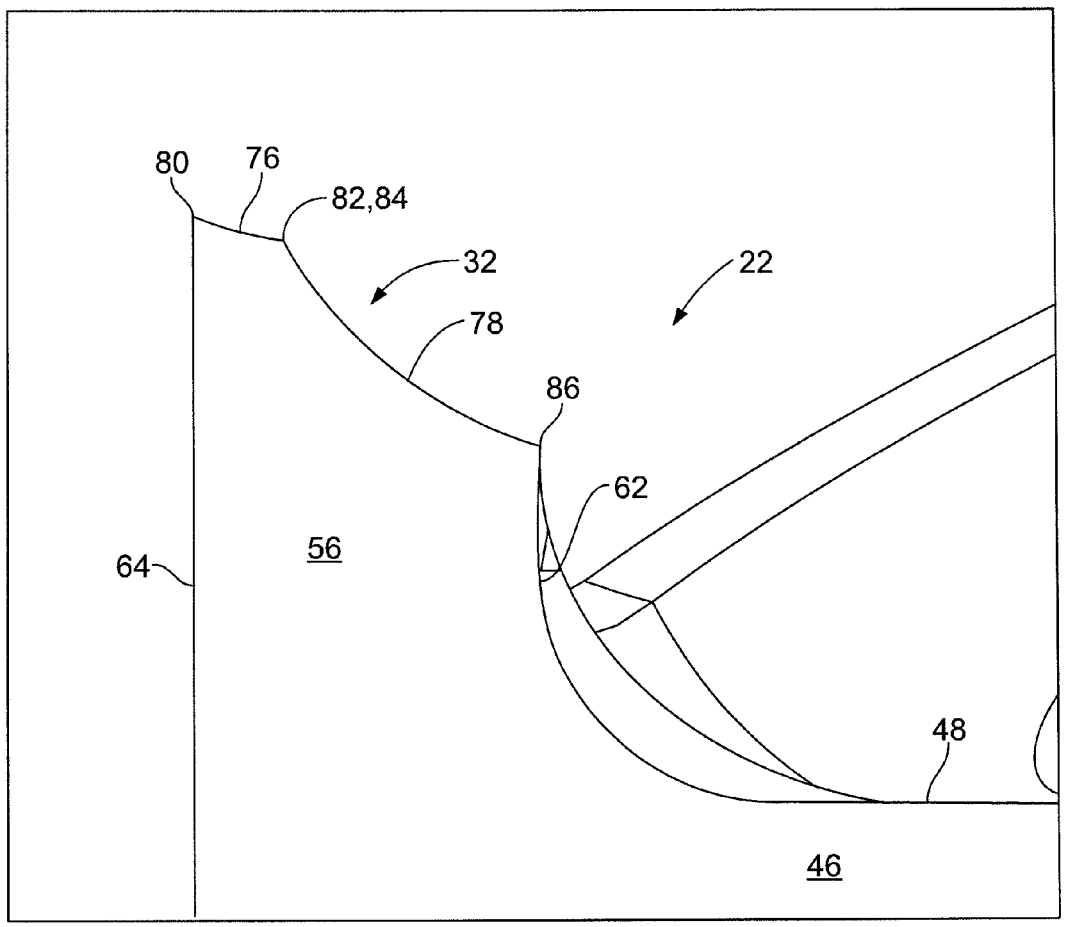
FIG. 5 is an enlarged cross-sectional view of a portion of the punch.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity.

A punch assembly 20 is provided which includes a punch 22, a sleeve 24, a draw stud 26 and a die 28. The punch assembly 20 is used to punch a hole through a workpiece 30, such as metal, such as mild steel and stainless steel, fiberglass, plastic, etc. The punch assembly 20 is specially designed to also be able to punch 10-gauge stainless steel. The punch assembly 20 can be used to punch holes in the workpiece 30 up to 4.5" diameter to accept 4" conduit.

The punch assembly 20 provides three aspects which aid in reducing the punching force necessary to punch through the workpiece 30 so that existing hydraulic drivers (not shown), which have an 11 ton maximum, can be used to punch larger holes in tougher, thicker steel. The first aspect is the provision of a novel punch profile 32 on the punch 22. The punch profile 32 provides a cutting edge 34 that has a uniform "sharpness" along entire perimeter of the punch 22. The second aspect is that additional punch-to-die clearance is provided over what was done in the prior art. This reduces excessive punching forces which result from axial deflection of the draw stud 26 and "tipping" of a large diameter punch 22 as the draw stud 26 deflects under load. The third aspect is an improved sleeve 24 which adds rigidity to the draw stud 26, thereby reducing elastic deflection of the draw stud 26, reducing bending moment on the draw stud 26, reducing punching force, and extending the punch 22, draw stud 26 and die 28 fatigue life. The sleeve 24 also aids in axial alignment of the punch 22, die 28 and workpiece 30 with a pilot hole 36 drilled through workpiece 30.

A first end 38 of the draw stud 26 is threaded to a ram (not shown) of the hydraulic punch driver. A second end 40 of the draw stud 26 is inserted through the die 28 and through the pilot hole 36 provided through the workpiece 30, the draw stud 26 having a circumference that is less than the circumference of the pilot hole 36. The sleeve 24 is threadedly attached to the punch 22. The punch 22 and sleeve 24 are then attached to the second end 40 of the draw stud 26 on the opposite side of the workpiece 30 than is the die 28 and the hydraulic punch driver.

An operator actuates a hand pump of the hydraulic punch driver which causes hydraulic fluid to force the ram to pull the draw stud 26. The draw stud 26, in turn, pulls the punch 22 and the sleeve 24 through the workpiece 30 into the die 28 such that the desired hole size is punched.

The punching assembly 20 and the hydraulic punch driver and ram are portable; i.e., an operator can easily carry the punching assembly 20 and hydraulic punch driver and ram around to job sites.

The die 28 used with the present invention is conventional. The die 28 has a base wall 42 which has a circular depending wall 44 extending from the perimeter of the base wall 42. A central passageway 46 extends through the axial center of the base wall 42. The size of the die 28 used with the present invention is dictated by the size of the punch 22 used.

First Aspect—Punch Profile

The punch 22 includes a cylindrical punch body 46 having a first end surface 48 and a second, opposite end surface 50, an extension 52 extending from the second end surface 50 and which has an end surface 54, and a cylindrical punch wall 56 extending from the second end surface 50. The punch 22 is preferably formed of S7 bar stock AISI tool steel, which is a shock resisting tool steel which ensures punching without excessive wear or breakage. An example of such tool steel is sold under the brand name HI SHOCK. The punch body 46 has a thickness which is defined as the distance between the first and second end surfaces 48, 50. The extension 52 is cylindrical and has a diameter which is less than the diameter of the punch body 46. A passageway 58 extends axially through the punch body 46 and the extension 52. A centerline 59 is defined through the center of the passageway 58. The second end surface 50 of the punch body 46 and the end surface 54 of the extension 52 are planar and parallel with each other. The first end surface 48 is planar and parallel with end surfaces 50, 54, with the exception of a chamfer 60 provided at the end of the passageway 58. The chamfer 60 is preferably angled at 45 degrees relative to the planar first end surface 48. The wall forming the passageway 58 is threaded and threadably receives the sleeve 24 as discussed herein.

The punch wall 56 extends upwardly from the first end surface 48 of the punch body 46 at the outer edge thereof and extends around the entire perimeter of the punch body 46. The punch wall 54 is spaced from the passageway 58 a predetermined distance. The punch wall 54 has an interior surface 62 and an exterior surface 64. The punch wall 54 is formed of a plurality of alternating flutes 66 and lobes 68. Each lobe 68 has a pair of walls 70a, 70b which angle from a piercing point 72 which is at the apex. The base 74 of each flute 66 is curved. As shown, three flutes 66 and three lobes 68 are preferred, however, this number may vary. The provision of three lobes 68 aids in preventing tipping of the punch 22 as pierces the workpiece 30. The interior surface 62 of the punch wall 56 is generally circular, however, the circular profile is broken by the base 74 of each flute 66. The exterior surface 64 of the punch wall 54 is circular.

The punch profile 32 is formed on the free end of the punch wall 56. The base of the punch wall 54 where the punch wall 54 meets the punch body 46 has a constant width between its interior surface 62 and its exterior surface 64. The width of the punch wall 54 varies as the punch wall 54 progresses away from the first end surface 48 of the punch body 46 as a result of the punch profile 32.

The punch profile 32 is defined by a first inclined cutting surface 76 which extends between the exterior surface 64 of the punch wall 56, and a second shearing surface 78 extending between the cutting surface 76 and the interior surface 62 of the punch wall 56. As a result, a first end 80 of the cutting surface 76 is defined at the exterior surface 64 and a second end 82 of the cutting surface is provided at the first end 84 of the shearing surface 78. The second end 86 of the shearing surface 78 is provided at the interior surface 62 of the punch wall 56. The cutting surface 76 is angled relative to the centerline 59 of the punch 22. The cutting surface 76 preferably has a thickness of 0.090", and may be in the range of 0.060" to 0.090". The shearing surface 78 is substantially thicker than the cutting surface 76 and the shearing surface 78 is thick enough to provide robustness to the punch wall 56 so that the punch wall 56 does not buckle during use. The shearing surface 78 is angled relative to the cutting surface 76 and is angled relative to the centerline 59. The cutting surface 76 and the shearing surface 78 extend around the entire perimeter of the punch wall 56.

The cutting surface 76 has a positive cut edge geometry (the included angle between the cutting surface 76 and the exterior surface 64 of the punch 22 is less than 90 degrees) around the entire perimeter of the punch wall 56. The cutting surface 76 tapers inwardly from the exterior surface 64 to the shearing surface 78, and tapers toward the first end surface 48 of the punch body 46 such that the distance the first end 80 which is formed at the cutting edge 34 of the cutting surface 78 is spaced from the first end surface 48 is greater than the distance the second end 82 of the cutting surface 76 is spaced from the first end surface 48. The cutting surface 76 is preferably angled at an angle of 20 degrees relative to the planar first end surface 48. As shown, the cutting surface 76 is slightly arcuate-shaped, however, the cutting surface 76 can be flat.

The shearing surface 78 may be tapered from its first end 84 to its second end 86 or it can be parallel or substantially parallel (if arcuate, as described herein) to the first end surface 48 of the punch body 46. The critical provision of the shearing surface 78 is that no portion of the shearing surface 78 is spaced from the first end surface 48 of the punch body 46 at a greater distance than the first end 80 of the cutting surface 76. As shown, the shearing surface 78 is arcuate-shaped.

The punch profile 32 consisting of the cutting and shearing surfaces 76, 78 extends around the entire perimeter of the punch wall 56.

The punch 22 having the punch profile 32 shown in the drawings can be easily manufactured from bar stock. First, the basic shape of the punch body 46 and lobed/fluted punch wall 56 (without the punch profile) is formed in a conventional manner. Next, the cutting surface 76 is machined with a stock "ball nose end mill" which creates a uniform geometry around the entire perimeter of the punch wall 56. Use of the stock ball nose end mill creates the arcuate shape of the cutting surface 76. Thereafter, the shearing surface 78 is machined with the stock ball nose end mill which creates a uniform geometry around the entire perimeter of the punch wall 56. Use of the stock ball nose end mill creates the arcuate shape of the shearing surface 78. Multiple passes of the ball nose end mill may be necessary to form the cutting and shearing surfaces 76, 78. The punch 22 is formed using a standard 1" ball nose end mill which is computer programmed to travel the circumference of the punch wall 56 to produce the punch profile 32. Other means of forming the punch profile 32 are within the scope of the present invention, however, use of ball milling provides a fast means for forming the punch profile 32.

The punch profile 32 of the present invention provides lower punching force versus the prior art, increased punch durability because the surfaces of the punch profile 32 has the same geometry (optimized) around the perimeter of the punch wall 45, and there is a saving in the cost of tooling as custom milling tools are no longer required.

Second Aspect—Additional Punch-to-Die Clearance

The punch-to-die clearance used with the present invention is contrary to the standard punch-to-die clearance used in the industry. When punching stainless steel, a higher bending moment occurs because of the tensile strength of stainless steel and because of the size of the die/punch which amplifies the moment arm. The punch-to-die clearance used with the present invention reduces excessive punch forces due to axial deflection of the draw stud 26 and "tipping" of large diameter punches 22.

Figure 6:
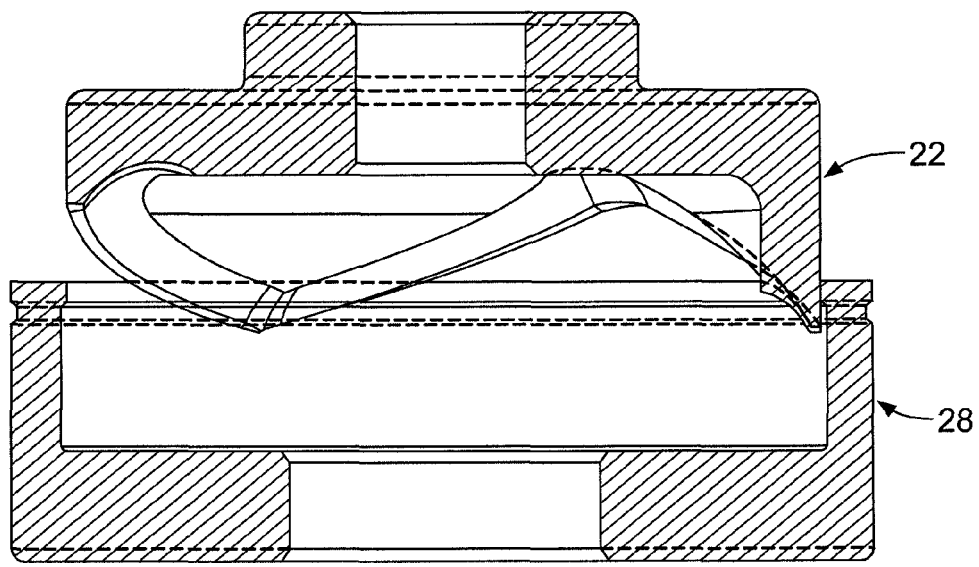
FIGS. 6 and 7 are cross-sectional views of the punch assembly showing the punch being inserted into the die.

FIG. 6 shows a cross-sectional view of the punch 22 and die 28. The punch-to-die clearance is defined as (die diameter−the punch diameter)/2. When the punch 22 and the die 28 are aligned axially and radially, the punch 22 can enter the die 28 with a clearance of 0.011 inches ((4.580−4.558)/2=0.011 punch-to-die clearance) around the circumference of the punch 22. This punch-to-die clearance is often expressed as a percentage of the thickness of the workpiece 30 being punched. To punch 10 gage (0.134") steel, the punch-to-die clearance expressed as a percentage is:

$$0.011/0.134=8\%$$

Much has written regarding the industry standards for punch/die clearance. The industry standard for punch/die clearance for hard materials is 6% to 10% of the workpiece 30 thickness.

Figure 7:
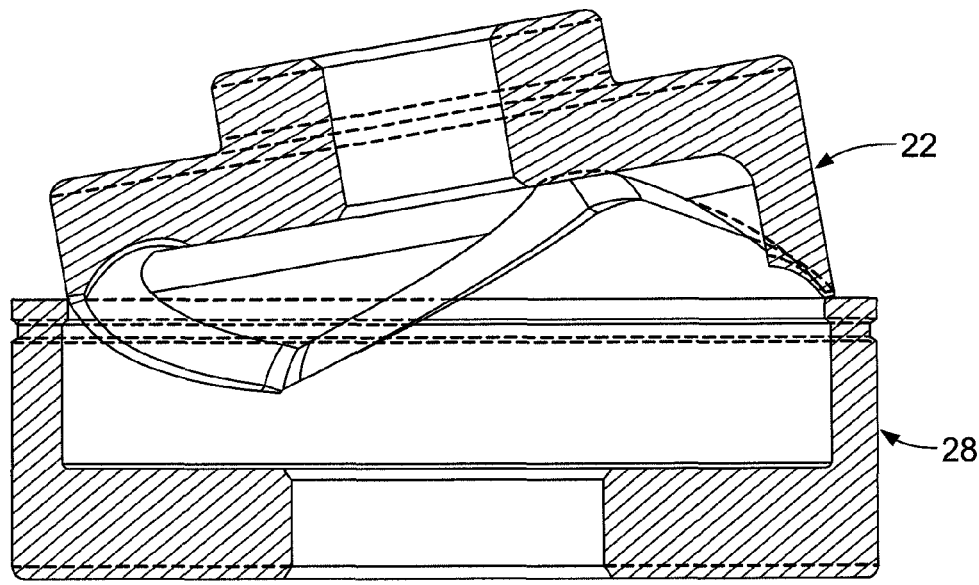

In actual practice, the workpiece being punched naturally has regions of higher and lower hardness due to chemistry and manufacturing variation, and the punch profile has regions of greater sharpness and lesser sharpness due to design and manufacturing variations. During normal service life of the punch, the cutting edge of the punch suffers wear and minor deformation which result in further variation in the sharpness and cutting ability of the punch. These variations result in non-symmetrical forces on the punch creating force moment which causes the draw stud to deflect allowing the punch to tip as shown in FIG. 7. While the diameters of the punch and die allow for the industry standard 6%-10% punch-to-die clearance, the tipping of the punch as one piercing point of the punch enters the die, results in interference for the other piercing point(s) yet to enter the die.

The Applicant's testing of a 4" conduit size punch resulted in approximately 10 degrees of tipping. By experimentation, the Applicant determined that 15%-20% punch-to-die clearance is needed to prevent interference of the tipping punch. If the punch-to-die clearance is too small, the punch force is high as the piercing point may strike the wall of the die instead of entering freely. If the punch-to-die clearance is greater than 20%, the testing revealed a tendency for the workpiece to "extrude" into the gap between the punch and die also resulting in high punch force.

By providing additional punch-to-die clearance, i.e. 15%-20% punch-to-die clearance, the forces on the punch 22 are minimized, deflection of the draw stud 26 is minimized, and tipping of the punch 22 is minimized. These reduced forces and improved alignment significantly increased the durability life of the punch 22, sleeve 24, draw stud 26, and die 28. As a result, a larger punch-to-die clearance leads to a lower frequency of "chipping" the punch 22 or the die cutting edge due to misalignment of the punch 22 and die 28, a lower punching force, and increased punch durability.

Third Aspect—Improved Sleeve

The sleeve 24 provided in the present invention reduces the elastic deflection of the draw stud 28, reduces the bending moment on the draw stud 28, aids in the axial alignment of the punch 22, die 28 and workpiece 30, reduces the required punching force, and extending the punch 22, draw stud 26 and die 28 fatigue life.

Figure 12:
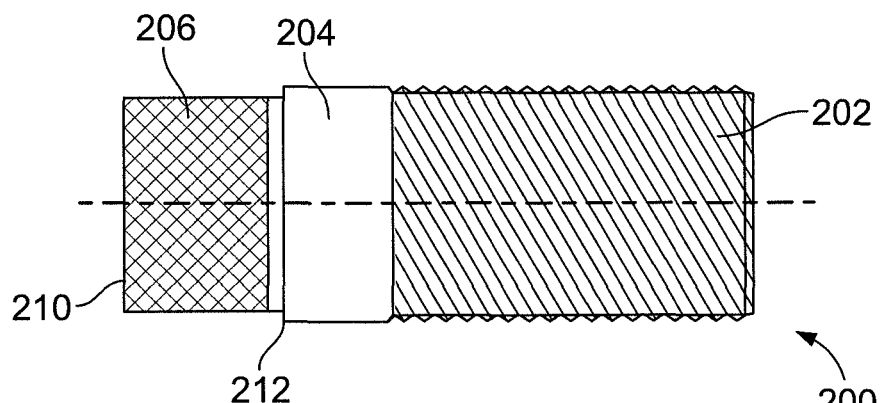
FIG. 12 is a side elevational view of a prior art sleeve.
Figure 13:
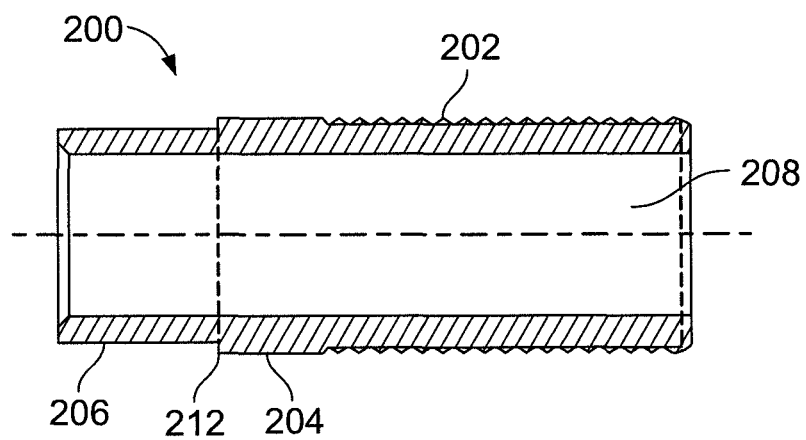
FIG. 13 is a cross-sectional view of the prior art sleeve of FIG. 12.

Prior art sleeves 200, such as that shown in FIGS. 12 and 13, have a first elongated threaded section 202, a second unthreaded section 204 extending from the first section 202, and a third knurled section 206 extending from the second section 204. An axial passageway 208 extends through each section 202, 204, 206. The first threaded section 202 is longer than the thickness of the punch body 46. The first and second sections 202, 204 have the same outer diameter, and the third section 206 has an outer diameter which is smaller than the outer diameter of the first and second sections 202, 204. The free end of the third section 206 defines a nose 210 which has a sharp corner. The intersection between the second and third sections 204, 206 forms a shoulder 212. The first section 202 is threaded into the passageway 60 in the punch 20 and the draw stud 38 passes through the passageway 208. A problem sometimes arises if the operator does not properly thread the sleeve 200 into the punch 20. If the operator threads the first section 202 too far into the passageway 58 of the punch 20, the nose 210 of the sleeve 200 is positioned behind the cutting edge 76 of the punch 20. As a result, the sleeve 200 will not enter the pilot hole 36 before engagement of the punch 20 with the workpiece 30. If this occurs, the nose 210 may engage the workpiece 30 instead of passing through the pilot hole 36, which will cause an improper punching action. In addition, as a result of the provision of the shoulder 212 on the prior art sleeve 200, the shoulder 212 sometimes engages the workpiece 30 instead of passing through the pilot hole 36. This also causes an improper punching action.

In the present invention, the sleeve 24 has a first threaded section 88, a second knurled section 90 extending from the threaded section 88, and a third unthreaded section 92 extending from the knurled section 90. An axial passageway 94 extends through each section 88, 90, 92. At least a portion of the passageway 94 is threaded, preferably the portion which is provided within the threaded section 88 and part of the knurled section 90. The end of the first section 88 has a chamfer 96 thereon. The first threaded section 88 and the third unthreaded section 92 have the same outer diameter, and the second knurled section 90 has an outer diameter which is slightly smaller than the outer diameter of the first and third sections 88, 92. The free end of the unthreaded section 92 defines a nose 98. The nose 98 has a chamfer 100 thereon. The threaded section 88 is threaded into the passageway 58 in the punch 22. The draw stud 26 is threaded into the passageway 94 of the sleeve 24.

The threaded section 88 of the sleeve 24 has a length which corresponds to the thickness of the cylindrical punch body 46.

As a result, the sleeve 24 is threaded into the front of the punch 22 (passing from the first end surface 48 of the punch body 46, through the passageway 58 to the second end surface 50 of the punch body 46) until the thread on the threaded section 88 bottoms onto the punch body 46. This proper positioning of the sleeve 24 permits the overall sleeve length to be increased so that the nose 98 of the sleeve 24 is always positioned before (i.e. the nose 98 is farther away from the punch body 46 than the piercing points 72 of the punch profile 32 are away from the punch body 46), and thus, the sleeve 24 always pilots in the pilot hole 36 of the workpiece 30 before the piercing points 72 of the punch 22 begin to punch the hole in the workpiece 30.

The knurls are not provided on the third unthreaded section 92 (the section 92 that first enters the workpiece pilot hole 36). Instead, a smooth nose 98 is provided at the end of the sleeve 24 to pilot into the workpiece 30. The second section 90 is knurled to facilitate manual assembly with the punch 22.

As a result, the sleeve 24 provides for a proper and correct assembly of the sleeve 24 and the punch 22. Interference between the sleeve 24 and the workpiece 30 is prevented. The sleeve 24 also provides rigidity to the draw stud 26 which results in longer life for the draw stud 26 as a result of less frequent bending and breakage.

Operation of the punch assembly 20 will now be discussed. As explained above, the operator threads the first end 38 of the draw stud 26 to the ram of the hydraulic punch driver. The second end 40 of the draw stud 26 is inserted through the die 28 and through the pilot hole 36 of the workpiece 30, the draw stud 26 having a diameter which is less than the diameter of the pilot hole 36. The sleeve 24 is threadedly attached to the punch 22 by threading the first section 88 into the passageway 58 of the punch 22 until the threaded section 88 bottoms out. The chamfer 96 on the first section 88 promotes the entry of the sleeve 24 into the punch passageway 58. The operator can easily see that the punch 22 is properly threaded with the sleeve 24. The punch 22 and sleeve 24 are then attached to the second end 40 of the draw stud 26 on the opposite side of the workpiece 30 than is the die 28 and the hydraulic punch driver. The punch 22 and sleeve 24 are attached to the draw stud 26 by threading the second end 40 of the draw stud 26 into the sleeve passageway 94.

An operator actuates a hand pump of the hydraulic punch driver. When the hand pump of the hydraulic punch driver is actuated, hydraulic fluid forces the ram to pull the draw stud 26. The draw stud 26, in turn, pulls the sleeve 24 and attached punch 22 through the workpiece 30 into the die 28 such that the desired hole size is punched. The nose 98 of the sleeve 24 first enters the pilot hole 36 in the workpiece 30 as the nose 98 extends further away from the punch body 46 than the piercing points 72 on the punch profile 32. This provides for the correct alignment of the punch 22 with the die 28. The ram pulls the draw stud 26, which in turn pulls the sleeve 24 and attached punch 22 such that the piercing points 72 pierce through the workpiece 30 and the workpiece 30 is cut along the cutting surface 76 formed by the punch profile 32 which forms a burnish on the workpiece 30. After the workpiece 30 is cut along the cutting surface 76, the shearing surface 78 shears the workpiece 30 to form a slug and to create a hole having a diameter equivalent to the outer diameter of the punch wall 56/punch body 46, which is larger than the diameter of the pilot hole 36. The shearing surface 78 also provides a relief to move the slug away from the punched opening through the workpiece 30 and forms the slug into a profile that permits easier removal from the die 28.

The configuration of the punch 22 maintains a constant shearing angle throughout the punching cycle except for the piercing points 72 used to initially pierce the workpiece 30. Prior art punches typically have an elevated punching force at the end of the punching cycle.

While a preferred embodiment is shown and described, it is envisioned that those skilled in the art may devise various modifications of the present invention without departing from the spirit and scope of the appended claims.

What is claimed is:

1. A punching assembly comprising:
   a punch having a punch body having a first end surface and a second end surface, a punch wall extending from said first end surface to a free end, said punch wall having a punch profile on said free end, and a threaded passageway extending through said punch body, said punch body having a thickness defined between said end surfaces; and
   a sleeve having a first threaded section having a diameter, a second section having a diameter and extending from said first threaded section, and a third unthreaded section having a diameter and extending from said second section, said first threaded section and said third unthreaded section having the same outer diameter, and said second section having an outer diameter which is slightly smaller than the outer diameter of the first and third sections, said first threaded section having a length which corresponds to the thickness of said punch body, and an axial passageway extending through said sections, wherein at least a portion of said passageway of said sleeve is threaded,
   wherein said punch is threaded onto said first threaded section such that said second and third sections extend from said first end surface of said punch, and said third section extends past said punch profile on said punch wall.

2. The punch assembly of claim 1, wherein said threaded portion of said passageway of said sleeve is provided within said first threaded section and a portion of said second section.

3. The punch assembly of claim 1, wherein said second section is knurled.

4. The punch assembly of claim 3, wherein said threaded portion of said passageway of said sleeve is provided within said first threaded section and a portion of said second knurled section.

5. The punch assembly of claim 1, wherein an end of said first threaded section has a chamfer.

6. The punch assembly of claim 1, wherein an end of said third unthreaded section defines a nose having a chamfer thereon.

7. A method of assembling a punching assembly comprising:
   providing a punch having a punch body having a first end surface and a second end surface, a punch wall extending from said first end surface to a free end, said punch wall having a punch profile on said free end, and a threaded passageway extending through said punch body, said punch body having a thickness defined between said end surfaces; and
   providing a sleeve having a first threaded section having a diameter, a second section having a diameter and extending from said first threaded section, and a third unthreaded section having a diameter and extending from said second section, said first threaded section and said third unthreaded section having the same outer diameter, and said second section having an outer diameter which is slightly smaller than the outer diameter of the first and third sections, said first threaded section having a length which corresponds to the thickness of said punch body, and an axial passageway extending through said sections, wherein at least a portion of said passageway of said sleeve is threaded, inserting said sleeve through said first end surface and threading said first threaded section with said passageway of said punch such that said second and third sections extend from said first end surface of said punch.

8. The method of claim 7, wherein said second section is knurled, and wherein an operator grasps said knurled second section to threadedly engage said sleeve and said punch together.

9. The method of claim 7, further comprising inserting a draw stud into said passageway of said sleeve after said sleeve and punch are assembled together, and threading said draw stud with said passageway of said sleeve.

10. The method of claim 9, wherein said passageway of said sleeve is threaded within said first threaded section and a portion of said second section.

11. The method of claim 7, further comprising threading a first end of a draw stud to a ram of a hydraulic punch driver; inserting a second opposite end of said draw stud through a die and through a pilot hole of a workpiece, said draw stud having a diameter which is less than a diameter of the pilot hole; attaching said assembled punch and sleeve to said second end of said draw stud on an opposite side of said workpiece than where said die and hydraulic punch driver are provided, wherein when said hydraulic punch driver is actuated, said sleeve first enters said pilot hole prior to said punch profile on said punch engaging said workpiece.

* * * * *